United States Patent [19]

Tardieu

[11] 4,208,601
[45] Jun. 17, 1980

[54] DISTRIBUTOR FOR ELECTRIC D.C. MACHINE

[75] Inventor: Pierre Tardieu, Chateauneuf sur Sarthe, France

[73] Assignee: Societe Anonyme Dite: ARTUS, France

[21] Appl. No.: 853,897

[22] Filed: Nov. 22, 1977

[30] Foreign Application Priority Data

Nov. 23, 1976 [FR] France .................. 76 35245

[51] Int. Cl.² .......................................... H02K 13/00
[52] U.S. Cl. .................................. 310/231; 310/128; 310/233
[58] Field of Search ............... 310/46, 231, 232, 230, 310/238, 128, 219, 227, 233, 241, 229

[56] References Cited

U.S. PATENT DOCUMENTS

| 901,978 | 10/1908 | MacMillan | 310/219 |
|---|---|---|---|
| 2,409,600 | 10/1946 | Trautschold | 310/219 |
| 2,467,758 | 4/1949 | Lindenblad | 310/219 |
| 3,534,203 | 10/1970 | Sommeria | 310/46 |
| 3,544,868 | 12/1970 | Bates | 310/231 |
| 3,819,964 | 6/1974 | Noodleman | 310/46 |
| 3,870,914 | 3/1975 | Walker | 310/219 |
| 3,876,892 | 4/1975 | Noodleman | 310/128 |
| 3,892,987 | 7/1975 | Noodleman | 310/46 |
| 3,937,993 | 2/1976 | Noodleman | 310/128 |

FOREIGN PATENT DOCUMENTS

| 2130242 | 12/1972 | Fed. Rep. of Germany | 310/231 |
|---|---|---|---|
| 2327793 | 12/1974 | Fed. Rep. of Germany | 310/219 |
| 485518 | 4/1973 | U.S.S.R. | 310/219 |

Primary Examiner—R. Skudy
Attorney, Agent, or Firm—Lerner, David, Littenberg & Samuel

[57] ABSTRACT

The present invention relates to a distributor for an electric D.C. machine comprising a commutator associated with two elastically deformable conductor rings, each forming a wing placed above the commutator on the path of at least one roller carried by a moving element, each roller establishing, by elastic deformation of the corresponding ring, a mobile electrical contact between said ring and the commutator. The invention is more particularly applied to rotary machines.

8 Claims, 5 Drawing Figures

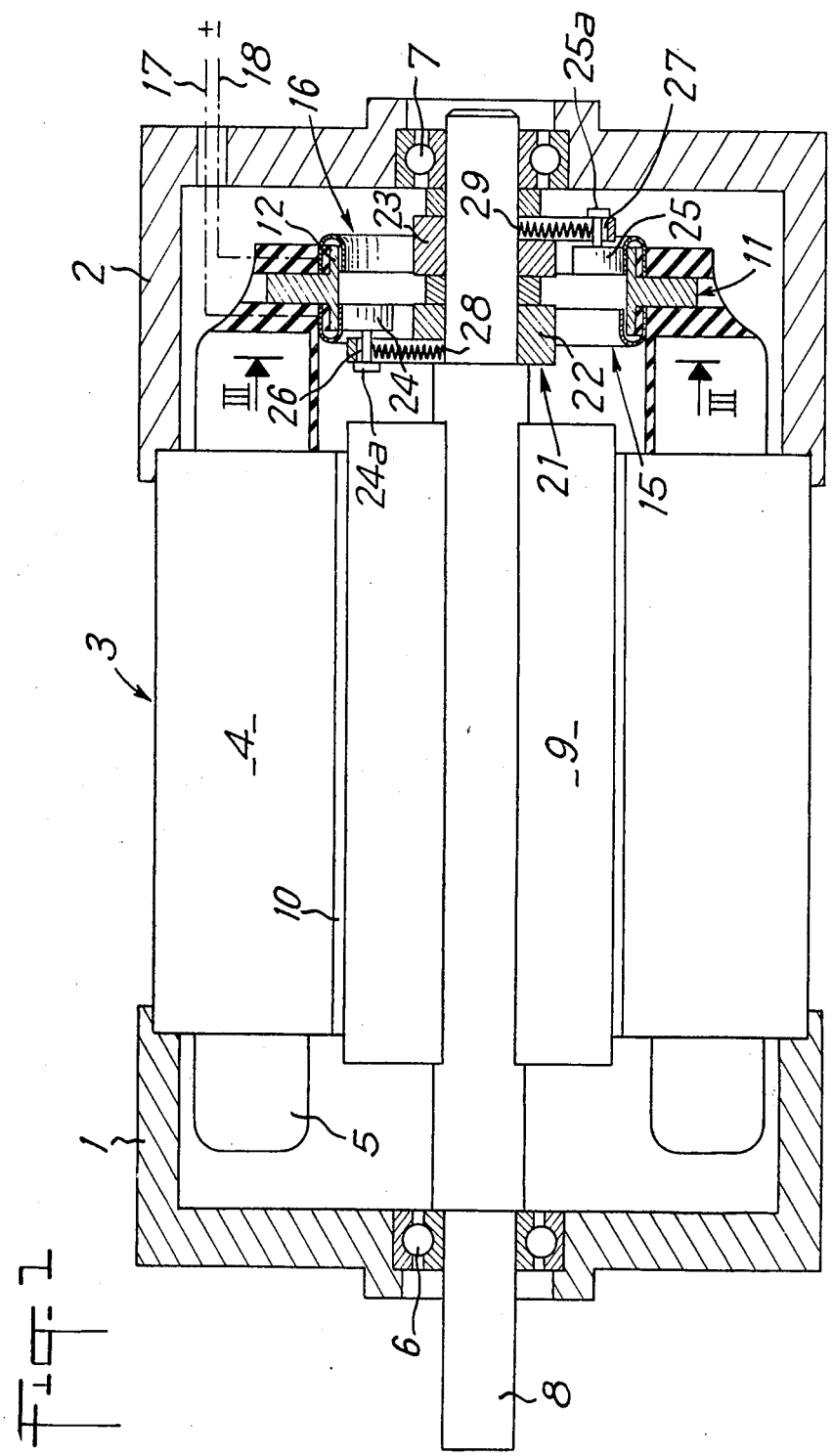

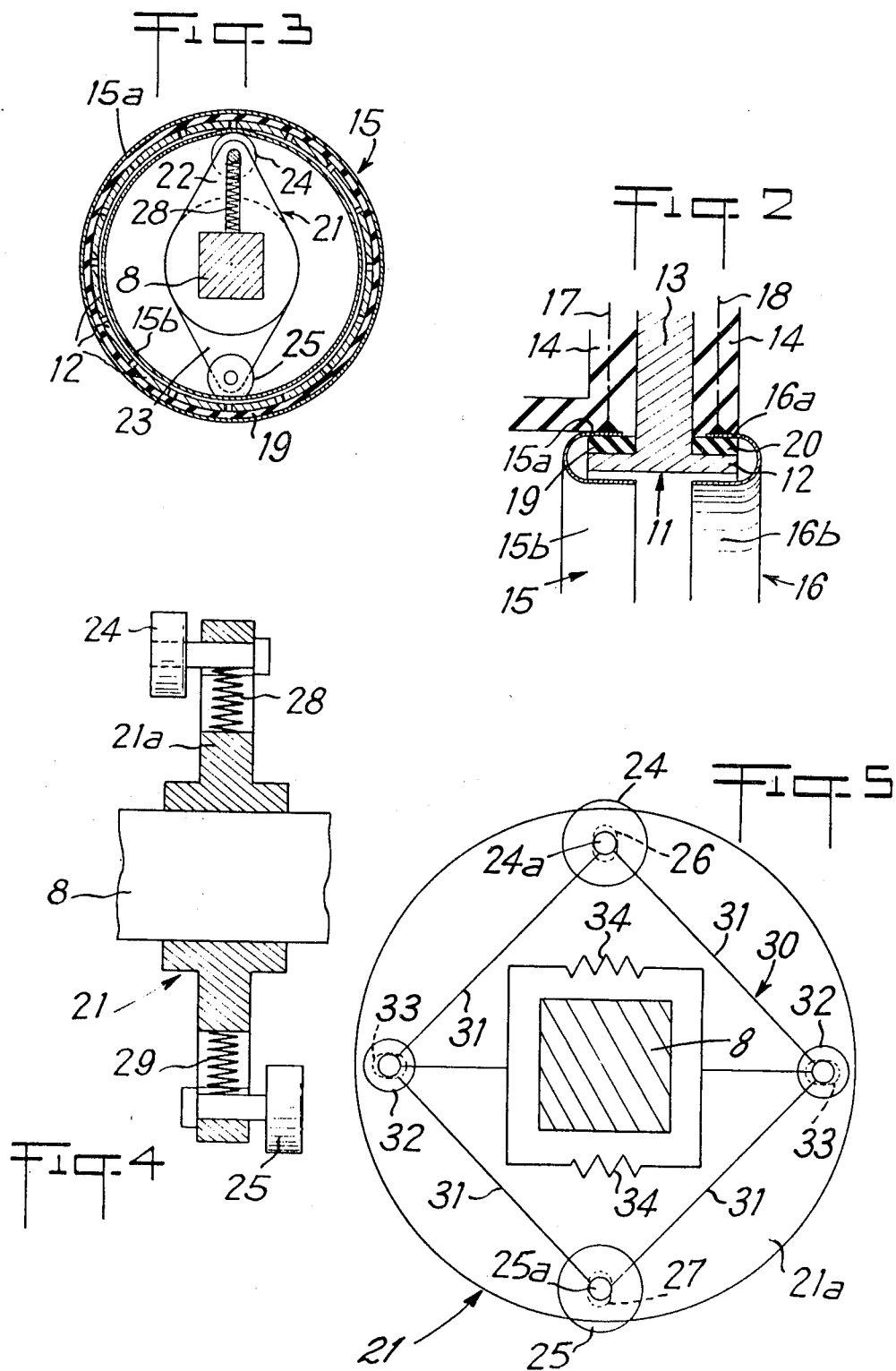

DISTRIBUTOR FOR ELECTRIC D.C. MACHINE

BACKGROUND OF THE INVENTION

The present invention relates to a distributor for an electric D.C. machine.

FIELD OF THE INVENTION

It relates to the means employed for ensuring the supply of the motor of an electric D.C. machine and, more particularly, to the machines of the reversed type, i.e. those whose wire-coiled armature is fixed, whilst the inductor is mobile.

SUMMARY OF THE PRIOR ART

D.C. machines of conventional design comprise an inductor, which is wire-coiled or with permanent magnets, producing magnetic poles, as well as a mobile wire-coiled armature. The current is directed in the windings of the armature via a commutator mobile with said armature and a system of brushes occupying a fixed position. In such a construction, the interaction between the magnetic fields of the inductor and the magnetic fields created by the D.C. supply of the windings of the armature, causes the displacement of said latter, and causes the bars of the commutator to move opposite the brushes. A construction of this type has the drawback of causing a considerable wear of the brushes and the bars of the commutator by the friction resulting from the rotation, as well as by the heating due to the passages of the supply current and the cuts resulting from the interruption of contact between the brushes and the different successive bars of the commutator.

The above drawbacks, as well as the developments in permanent magnet technology, have made it possible to design the above machines as a reversed type, i.e. comprising a fixed wire-coiled armature and a mobile inductor. In such a design, the commutator formed by the contact bars of the windings of the armature becomes fixed and, consequently, the brush system, which must occupy a fixed position with respect to the poles of the inductor, therefore becomes mobile with said latter.

In a type of construction as recalled hereinabove, it is noted that, to conduct the current to the rotary brushes, the present technique consists in using a system of conductor rings with brushes fixed in space, i.e. to some extent, duplicating the first commutator-brush system. Experiments have made it possible to determine that such a system has for its effect to reduce the performances and reliability of an electric machine designed in this way. In fact, it results in a multiplication of the mobile contacts, this increasing the contact resistance, the wear of the brushes and the clogging of the commutators and conductor rings. Furthermore, in the case of a rotary machine, the effect of the centrifugal force on the mobile brushes considerably modifies their property of contact and tends to increase the wear thereof, which constitutes one of the factors reducing the performances of the machine.

To remedy the above drawbacks, various solutions have been proposed, particularly the use of an annular commutator bordered by two conductor rings with which it is placed in electrical connection via conductor rolls carried by a mobile cage, for example, rotating with the shaft when it is question of an electric motor of the rotating type. In such a design, each ring is connected to one of the poles of a source of electrical current and the rolls, with one or more treads, are mounted to rotate on spindles carried by the shaft.

The technical solutions recommended in this type of construction make it possible to produce a simpler supply device than the one comprising two ring-brush systems, but nevertheless do not enable all the problems raised by the supply of reversed motors to be solved. In fact, an arrangement for supplying via rings and rolls does not make it possible to avoid the relative sliding between the rolls and the conductor rings and the commutator, which sliding is a source of irregular wear considerably reducing the qualities of the surface contact between the conductor pieces. Moreover, the rolls represent pieces of relatively large mass eccentric with respect to the geometrical axis of rotation of the shaft, so that the centrifugal force exerts on these rolls, with respect to their axis of rotation, an effect of wear leading more or less rapidly to a radial clearance having for its effect to render the rolls floating, i.e. incapable of continuously establishing a suitable surface contact between the conductor rings and the commutator.

With a view to overcoming the above-mentioned drawbacks, it has also been proposed to ensure the supply of the windings of the fixed armature via rollers rolling on the conductor rings and on the commutator. In such a construction, the rollers are independent for each ring and the commutator, and are electrically connected for those having to cooperate via an electrical connection established from contact pieces themselves in abutment on the rotating rollers. Such a solution is complex, expensive to construct and maintain, and does not solve the major problem of wear of the contact pieces either by friction or by sliding thereof.

SUMMARY OF THE INVENTION

It is an object of the present invention to solve the different problems mentioned hereinabove by using a supply device more particularly intended for electric machines with reversed armature and inductor and capable of establishing a perfect electrical contact between the different bars of a commutator and the poles of an electrical source, by totally eliminating the friction or direct sliding between the commutator and the contact pieces electrically connected to the source of supply.

The present invention further provides the possibility of producing a simple, but robust distributor, which may easily be adapted to any type of electrical machines such as rotary engines or linear motors.

It is also an object of the invention to render possible, particularly in the case of an electric rotary engine, the compensation of the action of the centrifugal force on the rotating pieces, so as to maintain, between the mobile pieces electrically in contact, a substantially constant pressure of application, whatever the speed of rotation.

In accordance with the invention, the distributor for an electric D.C. machine is characterised in that, on the one hand, the commutator is associated with two independent, elastically deformable conductor rings, respectively connected to a pole of an electric source, and disposed relatively fixed and without surface contact, at least partly parallel and at a short distance from the commutator and, on the other hand, the moving element is formed by at least one mobile support bearing at least two relatively offset rollers each acting, at least under the effect of an elastic member and along the path which is imposed thereon by the support, in local elastic deformation of one of the rings to establish a mobile electrical contact between the commutator and said rings which are fixed relatively.

BRIEF DESCRIPTION OF THE DRAWINGS

FIG. 1 shows a section in elevation of the distributor according to the invention in its application to an electric rotary engine.

FIG. 2 is a partial section showing, on a larger scale, a detail of one of the elements constituting the distributor.

FIG. 3 is a transverse section taken substantially along the line III—III of FIG. 1.

FIG. 4 is a section in elevation similar to FIG. 1, showing another embodiment of one of the elements constituting the distributor.

FIG. 5 is an elevation illustrating a variant of the element of the distributor in its embodiment of FIG. 4.

DESCRIPTION OF THE PREFERRED EMBODIMENTS

Referring now to the drawings, FIG. 1 shows the distributor according to the invention in its application to an electric motor of the rotary and reversed type. The motor comprises, for example, two half-casings 1 and 2 which are intended to hold an armature 3 constituted, in known manner, by a core 4 and windings 5. The half-casings 1 and 2 define two bearings 6 and 7, e.g. ball bearings intended to support a rotating shaft 8 on which is mounted an inductor 9 constituted in known manner, by permanent magnets. Likewise in known manner, the inductor 9 defines with the armature 3 an air-gap 10.

The different coils 5 constituting the windings of the armature 3 are connected together, inside the volume defined by one of the half-casings, for example half-casing 2, by a commutator 11 which is constituted by the succession of bars connecting the windings 5. The commutator 11 is constituted and borne in any suitable manner so as to represent an annular element disposed concentrically with respect to the axis of shaft 8.

According to the invention, the commutator 11, shown in greater detail in FIG. 2, is constituted by the association of the bars 12 corresponding to the different windings 5 with which they are electrically connected via central contact pieces 13 which are relatively insulated by a coating 14 of non-conductive material. According to the invention, the commutator 11 is associated with two rings 15 and 16 respectively connected by conductors 17 and 18 to the poles of a source of direct current (not shown in the drawings). The conductors 17 and 18 are generally insulated by a sheath and housed in a common envelope which passes through the half-casing 2, as shown in broken lines in FIG. 1.

The rings 15 and 16 are made in the form of elastically deformable, conductive pieces, of small thickness, such as membranes, bands or strips. The rings 15 and 16 are preferably made in the form of annular U-sections each comprising two wings 15a and 15b and 16a, 16b extending substantially parallel to each other. The rings 15 and 16 are mounted on the commutator 11 via a wing, 15a and 16a respectively, which is fixed, by any suitable means, with the interposition of an insulating lining 19 or 20 behind the bars 12 of the commutator 11. The wings 15a and 16a represent elements for assembling and fixing the rings 15 and 16, at the same time as electrical connection pieces on which the conductors 17 and 18 are connected by any suitable means.

The rings 15 and 16 are disposed relatively so as to surround the bars 12 at their annular edges so that the wings 15b and 16b are placed parallel and at a short distance from the annular face defined by these bars, without contact between them. The two rings thus substantially form together an envelope surrounding the bars 12.

The distributor according to the invention also comprises a moving element generally designated by reference 21. In the embodiment shown in FIGS. 1 and 3, the moving element 21 comprises two supports 22 and 23 which are fixedly mounted on the part of the shaft 8 extending inside the half-casing 2. As shown, supports 22 and 23 rotate with shaft 8 and may be referred to as rotating support members 22 and 23. The mounting of the supports 22 and 23 is ensured in any suitable manner, axially and angularly, with the possibility of adjustment so that each of the supports occupies a definite fixed position, such as for example a diametrically opposite arrangement, as shown in FIG. 3. The supports 22 and 23 each carry at the end of a radial extension a roller 24 or 25 whose rotating spindle 24a or 25a is mounted inside an oblong slot 26 or 27 so as to be able to be subjected to a radial displacement of small amplitude. Each spindle 24a or 25a is, furthermore, subjected to the action of an elastic member 28 or 29 always urging it into its most extreme radial position in which the corresponding roller 24 or 25 abuts on the wing 15b or 16b facing it, giving it an elastic deformation such that it is then in surface contact with the annular surface defined by the bars 12 of the commutator 11. In the position illustrated in FIGS. 1 and 3, the element described hereinabove thus establishes between the commutator 11 and consequently certain of the windings corresponding to the bars 12 located on the points of contact established by the rollers 24, an electrical connection with the source of current via the conductors 17 and 18 and the elastically deformable wings 15b and 16b which are located on the path of the rollers 24 and 25.

The rotation of the shaft 8 under the action of the interaction of the magnetic fields of the inductor 9 and the magnetic fields produced by the supply of certain of the windings of the armature 3, has for its effect to displace the rollers 24 and 25 with respect to the fixed conductor rings 15 and 16 whose wings 15b 16b are thus subjected to a local elastic deformation progressing with the displacement of the rollers and establishing a mobile electrical contact between said rings and the bars which are, nevertheless, relatively fixed. The displacement of the electrical contact established between these pieces enables all the successive bars 12 to be placed in relation with the source of current, this ensuring the distribution of supply necessary for rotating the shaft 8. The arrangement according to the invention eliminates any friction between the pieces electrically in contact. The problems arising from the wear of the pieces in contact of present designs are also eliminated since the possible wear is limited to the rollers whose assembly enables any excessive clearance to be taken up to maintain between the bars 12 and the rings 15 and 16 a suitable surface contact.

FIG. 4 shows another embodiment in which the moving element is constituted by a support or rotating support member 21a which is common to the two rollers 24 and 25. Such an arrangement makes it possible to simplify the production of the moving element 21 and also to provide, in the case of the rollers 24 and 25 occupying diametrically opposite positions, a compensation of the masses enabling the element and the shaft 8 to be balanced. The support 21a may be constituted solely by radiating arms issuing from a common hub or, on the contrary, by a plate when it may be envisaged that the element 21 comprise a plurality of rollers 24 and a plurality of rollers 25 adapted to establish as many simultaneous points of contact with the conductor rings 15 and 16. Although this has not been shown, it is obvious that, in such a case of construction, the rollers 24 and 25 are shifted angularly so as to respect the supply of the different windings successively by the source of current.

In a variant embodiment of such a mode of construction as illustrated in FIG. 5, it may be envisaged to mount the different rollers of the same assembly, such as for example the rollers 24, 25 cooperating simultaneously with the same ring 15 on the support 21a via an articulated system 30 constituted by rigid connections 31 in the form of a deformable quadrilateral connecting the spindles of the rollers 24, 25 which are disposed in oblong slots similar to those provided in the preceding supports. The rigid connections 31 are furthermore connected, along a diameter perpendicular to the one passing through the rollers 24, 25 to the spindles of two flyweights 32 whose spindles are also guided in oblong slots 33 made in the support 21a. FIG. 5 shows, furthermore, that the spindles of the flyweights are connected together via at least one elastic member 34 with compressive stress and always acting to attempt to bring the flyweights 32 towards the centre, i.e. urge the rollers 24, 25 via the rigid connections 31, in radial extension into the position in which they simultaneously ensure the local elastic deformation of the wing 15b. Such an assembly presents the advantage of maintaining, by the spring 34, a certain pressure of application of the rollers 24, 25 against the wing 15b itself applied on the surface of the bars 12, but also of compensating, by the flyweights 32 acting against the spring 34, the action of the centrifugal force imposed on the rollers 24, 25. This assembly makes it possible to apply on the rollers 24, 25 a pressure of application of substantially constant value and to avoid at high speeds of rotation too high a pressure of application capable of disturbing the progressive elastic unwinding of the wings 15b and 16b under the action of the rollers.

Although it has not been shown, the distributor according to the invention may also be used in electric machines other than rotary engines and, for example, in linear motors. In such a case, the rectilinear commutator may then have a construction identical to the one shown in FIG. 2 and cooperate with a moving element which is then constituted in the form of a slide provided with rollers also intended for provoking the progressive local elastic deformation, as they are displaced, of the conductor membranes or bands 15 and 16.

What is claimed is:

1. An electric D.C. machine having rotor and stator assemblies comprising:
    a fixedly-mounted commutator including commutator bars forming an annular surface and being electrically connected to the windings of said stator assembly;
    two independent and non-rotatable elastically deformable conductor rings concentrically disposed relative to said commutator, each of said conductor rings being connected to a pole of an electric source and being spaced apart from said commutator;
    a moving element disposed internally of said commutator and including at least one rotating support member supporting at least two rollers offset with respect to each other;
    means for urging said rollers radially outwardly and into engagement with said conductor rings to locally elastically deform each of said conductor rings to establish a moving electrical contact between said commutator bars and said conductor rings as said support member rotates relative to said conductor rings.

2. An electric D.C. machine in accordance with claim 1, wherein each of said conductor rings has a U-shaped configuration, one of the legs of each of said U-shaped conductor rings being electrically connected to one of the poles of an electric source, and the other leg of each of said U-shaped conductor rings being out of surface contact with said commutator when in a non-deformed state and partially overlapping said commutator bars, and said other leg of each of said U-shaped conductor rings forming an annular path on which a corresponding one of said rollers rotates.

3. An electric D.C. machine in accordance with claim 1, wherein each of said conductor rings has a U-shaped configuration and arranged to surround and partly cover one of the longitudinal edges of said commutator, one leg of each conductor ring being mounted on said commutator and the other leg of each conductor ring being out of surface contact with said commutator.

4. An electric D.C. machine in accordance with claim 1, wherein said rotating support member rotates with said rotor, at least one of said rotating rollers being urged by a spring into engagement with one of said conductor rings for the elastic deformation thereof.

5. The distributor of claim 1, wherein the moving element comprises a mobile support for each roller.

6. The distributor of claim 1, wherein the moving element comprises a support common to the different rollers which are angularly offset for the two rings.

7. The distributor of claim 1, wherein the moving element comprises at least one rotating support bearing at least two rollers to act on each ring partially surrounding the annular commutator.

8. The distributor of claim 7, wherein the rollers corresponding to each conductor ring are mounted radially movable on the support via an articulated system comprising at least one compensating mass sensitive to the centrifugal speed and acting against at least one elastic member to transmit to the rollers a pressure of application on the corresponding conductor ring which is substantially constant independent of the speed of rotation given to the support.

* * * * *